United States Patent [11] 3,619,166

[72] Inventor Bruno Quebedeaux, Jr.
Wilmington, Del.
[21] Appl. No. 812,398
[22] Filed Apr. 1, 1969
[45] Patented Nov. 9, 1971
[73] Assignee E. I. du Pont de Nemours and Company
Wilmington, Del.

[54] METHOD OF INCREASING SUGAR CONTENT OF CROPS
7 Claims, No Drawings

[52] U.S. Cl. ..................................................... 71/86
[51] Int. Cl. ....................................................... A01n 9/36
[50] Field of Search ........................................... 71/86

[56] References Cited
UNITED STATES PATENTS
3,005,010  10/1961  Grisley ........................ 71/86 X Primary Examiner—James O. Thomas, Jr.
Attorney—John R. Powell ABSTRACT: The sugar content of sugar-containing crops such as sugar cane, can be increased by applying to the crops an effective amount of carbamoylphosphonate such as ammonium ethyl carbamoylphosphonate from two to eight weeks prior to normally scheduled harvest.

METHOD OF INCREASING SUGAR CONTENT OF CROPS

BACKGROUND OF THE INVENTION

This invention relates to the use of chemical compounds to increase the sugar content of sugar-containing crops. This invention is particularly directed to a method of increasing sugar content of those crops from which sugar is usually extracted.

In view of the present and projected growth in world population with a resultant need for increased productivity from the available tillable land, much research is being carried on to provide and apply new discoveries to increase the output of available land.

The instant invention is another step toward the goal of optimum land utilization, for this invention provides a method of increasing the efficiency of sugar-producing plants by increasing the per plant sugar content.

The potential significance, usefulness and need of a method such as herein claimed is recognized by the art as is evident from publications such as: "Preliminary Experiments on the Effects of Chemicals on the Ripening of Sugar Cane" by R. A. Yates and J. F. Bates at pages 174–189 of the Proceedings of the 1957 Conference of the British West Indies Sugar Technologists; "A Summary of Investigations on the Possibility of Artificially Ripening Sugar Cane with Various Chemicals" by H. Evans and J. F. Bates at pages 298–307 of the 1962 Proceedings of the International Society of Sugar Cane Technologists; and "Effects of Chemicals on Ripening of Sugar Cane" by L. G. Nickell and T. T. Tanimoto at pages 152–155 of the 1965 Report of the 24th Annual Conference of Hawaiian Sugar Technologists.

Related compounds such as the dialkyl carbamoylphosphonates disclosed in U.S. Pat. No. 3,005,010 as herbicides have long been known to the art. However, there is no teaching in the patent or any other publication of the sugar increase activity for the compounds of formula 1.

SUMMARY OF THE INVENTION

In summary, this invention relates to the method of increasing the sugar content of a sugar-containing crop which comprises applying to said crop from two to eight weeks prior to normally scheduled harvest an effective amount of a compound of the formula:

(1)

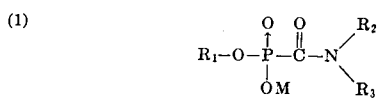

where $R_1$ is alkyl of one through eight carbon atoms, chloroalkyl of one through eight carbon atoms containing up to three chlorine atoms, bromoalkyl of one through eight carbon atoms containing up to three bromine atoms, alkoxyalkyl of from three through ten carbon atoms, total, alkenyl of two through eight carbon atoms, alkynyl of three through four carbon atoms, phenyl or benzyl; $R_2$ and $R_3$ can be the same or different and each can be hydrogen, alkyl of one through four carbon atoms, hydroxyalkyl of two through four carbon atoms, alkenyl of three through four carbon atoms, or alkynyl of three through four carbon atoms; $R_2$ and $R_3$ can be taken together to form a ring wherein $R_2$ and $R_3$ taken together are $-(CH_2)_2-O-(CH_2)_2-$ or $-(CH_2)_n-$ where $n$ is 4, 5 or 6, or one of $R_2$ and $R_3$ can be

where $R_4$ is hydrogen or alkyl of one through four carbon atoms and $R_5$ is hydrogen or alkyl of one through four carbon atoms, and M is hydrogen, sodium, lithium, potassium, calcium, magnesium, zinc, manganese, barium or

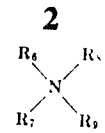

where $R_6$, $R_7$ and $R_8$ can be the same or different and each can be hydrogen, alkyl of one through four carbon atoms or hydroxyalkyl of two through four carbon atoms; and $R_9$ is hydrogen, alkyl of one through twelve carbon atoms,

where $R_4$ is hydrogen or alkyl of one through four carbon atoms and $R_5$ is hydrogen or alkyl of one through four carbon atoms, or benzyl.

Preferred compounds of this invention include those compounds of formula (1) where $R_1$ is alkyl of one through four carbon atoms or alkenyl of three through four carbons; $R_2$ and $R_3$ are each hydrogen; and M is ammonium or alkali metal such as sodium, lithium or potassium.

The most preferred compounds of this invention are ammonium allyl carbamoylphosphonate, ammonium ethyl carbamoylphosphonate and ammonium isopropyl carbamoylphosphonate.

DESCRIPTION OF THE INVENTION

This invention is based on the discovery that the compounds of formula (1) when applied to sugar-containing plants at the proper time during their growth results in a surprising increase in the sugar content of the plant. For sugar cane, sugar beets and sorghum, which are grown for sucrose production, this increase in sugar content is observed directly as an increase in the yield from a given area of cropland. With other plants, the increase is observed by analysis of the plant or by analysis of the harvested parts thereof. Obviously, increased sugar levels improve the palatability of the plant or plant parts and offer improved dietary value. While the physiological mechanism involved in this increase in sugar content is not fully understood, it is apparent that the compounds used in this invention redirect the carbohydrate metabolism of the plant in such a way as to increase the sugar level in the plant juices. In addition, the treatment results in an increase in juice purity and a decrease in the extraneous matter that must be handled at the mill when the sugar cane is harvested, resulting in a more efficient and economical milling of the crop. Similar benefits are observed in treatment of sugar beets and syrup sorghum with the compounds of formula 1.

PREPARATION

The ammonium carbamoylphosphonate salts of this invention are readily prepared by the interaction of the diesters of carboalkoxyphosphonic acids with aqueous solutions of ammonia, primary amines or secondary amines.

This reaction can be considered to occur in two steps as is illustrated by the following equations.

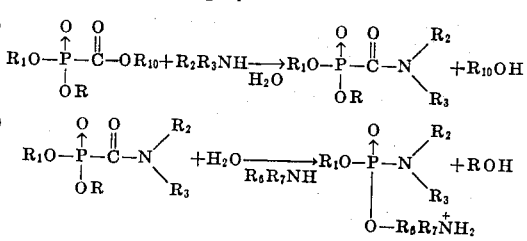

In equations (2) and (3) R is alkyl of one through eight carbon atoms, chloroalkyl of one through eight carbon atoms containing up to three chlorine atoms, bromoalkyl of one through eight carbon atoms containing up to three bromine atoms, alkoxyalkyl of from three through ten carbon atoms, alkenyl of two through eight carbon atoms, alkynyl of three through four carbon atoms, phenyl or benzyl; $R_1$ is alkyl of one through eight carbon atoms, chloroalkyl of one through eight carbon atoms containing up to three chlorine atoms, bromoalkyl of one through eight carbon atoms containing up to three bromine atoms, alkoxyalkyl of from three through ten carbon atoms, alkenyl of two through eight carbon atoms, alkynyl of three through four carbon atoms, phenyl or benzyl; $R_2$ and $R_3$ can be the same or different and each can be hydrogen, alkyl of one through four carbon atoms, hydroxyalkyl of two through four carbon atoms, alkenyl of three through four carbon atoms, or alkynyl of three through four carbon atoms; $R_2$ and $R_3$ can be taken together to form a ring system wherein $R_2$ and $R_3$ are collectively $-(CH_2)_2-O-(CH_2)-$ or $(CH_2)_n$ where $n$ is 4, 5 or 6, or one of $R_2$ and $R_3$ can be

where $R_4$ is hydrogen or alkyl of one through four carbon atoms and $R_5$ is hydrogen or alkyl of one through four carbon atoms; $R_{10}$ is alkyl of one through four carbon atoms, preferably methyl or ethyl; and $R_6$ and $R_7$ can be the same or different and each can be hydrogen, alkyl of one through four carbon atoms, hydroxyalkyl of two through four carbon atoms, alkenyl of three through four carbon atoms, or alkynyl of three through four carbon atoms; $R_6$ and $R_7$ can be taken together to form a ring system wherein $R_6$ and $R_7$ are collectively $-(CH_2)_2-O-(CH_2)-$ or $(CH_2)_n$ where $n$ is 4, 5, or 6, one of $R_6$ and $R_7$ can be

where $R_4$ is hydrogen or alkyl of one through four carbon atoms and $R_5$ is hydrogen or alkyl of one through four carbon atoms.

The synthesis method, exemplified by equations (2) and (3) involves concurrent or consecutive aminolysis and hydrolysis of the starting dialkyl carboalkoxyphosphonate by interaction with water and the amine reactant.

While equations (2) and (3) represent the route predominantly taken by the reaction when combined in one operation, some hydrolysis may occur during or before aminolysis. However, the postulated reaction sequence as represented by equations (2) and (3) favoring formation of the carbamoylphosphonate intermediate is proved experimentally, as it is possible in some instances to isolate the carbamoylphosphonate intermediate shown as the product of equation (2). It has, of course, also been experimentally demonstrated that the product of equation (3) is in fact obtained.

An alternate method for synthesis of those compounds of this invention where $R_1$ is substituted by chlorine or bromine consists of the addition of halogen or hydrogen halide to the double bond of the compounds of this invention where $R_1$ is alkenyl. This reaction is illustrated by equation (4).

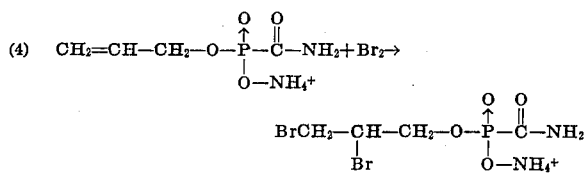

The dialkyl carbamoylphosphonates prepared as described above or by methods described in the chemical literature are readily hydrolyzed to the monoester salt compounds of this invention by addition to aqueous ammonia or amine solutions.

This procedure may be used therefore to obtain a "mixed" product, comprising a salt of one amine and an amide of another. This will be discussed and exemplified below.

The dialkyl carboalkoxyphosphonates and dialkyl carbamoylphosphonates used for the synthesis of the compounds of this invention can be prepared by methods available in the literature, such as Nylen, Chem. Ber. 57, 1023 (1924) and Reetz et al., J. A. C. S. 77, 3813-16 (1955) using appropriate ester intermediates. Generally, the alkoxy group of the carboalkoxyphosphonate is limited for practical purposes to methyl and ethyl, since there appears to be no advantage to increasing the size of the alcohol moiety. However, higher alcohol derivatives are useful in some instances.

The following are illustrative of typical diesters of the carboalkoxyphosphonates:
Diethyl carbomethoxyphosphonate
Diallyl carbomethoxyphosphonate
Diisopropyl carboethoxyphosphonate
Dibutyl carbobutoxyphosphonate
Dimethallyl carboethoxyphosphonate The following are illustrative of typical carbamoylphosphonate esters:
Diethyl carbamoylphosphonate
Diallyl N,N-diallylcarbamoylphosphonate
Diallyl carbamoylphosphonate
Dipropyl N-methylcarbamoylphosphonate
Dimethyl N-allylcarbamoylphosphonate
Bis(2-chloroethyl) carbamoylphosphonate The following are illustrative of the amines which can be used for the amination and/or hydrolysis of the esters:
Ammonia
Methylamine
Dimethylamine
Allylamine
Propylamine
Ethylamine
Morpholine
Piperidine
Methylhydrazine
N,N-Dimethylhydrazine
Ethanolamine More particularly, in the preferred procedure for preparing the ammonium alkyl carbamoylphosphonates of this invention, a dialkyl carboalkoxyphosphonate or dialkyl carbamoylphosphonate is added to a stirred aqueous solution of ammonia or other amine, stirring is continued until a clear solution is obtained. The resultant salt can then be isolated by removal of the water through evaporation or by stripping under reduced pressure. In general, these salts are stable white crystalline solids or viscous liquids. Those which are solid can be recrystallized from one or a mixture of several lower alcohols. However, most of the products are suitable for use without purification.

It is preferred that an excess of ammonia or amine be employed in this reaction to insure good yields and rapid reaction. A ratio of diester to amine of 1 to $\geq 2$ is employed. Preferably the ratio of diester to amine of between 1 to 2 and 1 to 10 is employed. The excess amine insures that amidation of the carboxylic ester rather than hydrolysis is the predominant reaction.

It is also preferred that a concentration of ammonia or amine of from 25 to 50 percent by employed, although the reaction can be operated at higher or lower concentrations.

When the amine reactant is not highly soluble in water, another solvent such as methanol or ethanol can be added to the aqueous system to solubilize the amine reactant and thereby increase its reactivity.

This process can conveniently be carried out at about room temperature, although higher temperatures can also be employed if it is desired to speed up the rate of reaction. This process is moderately exothermic, but can be controlled by regulation of the diester addition rate and/or by external cooling to maintain the desired temperature.

A highly satisfactory procedure is to slowly add the diester to a stirred aqueous solution of the amine which is cooled and maintained at about 15° C. When addition of the diester is complete, the temperature of the mixture is allowed to come to room temperature or slightly above. Generally, the reaction is complete in a few minutes to several hours depending on the reactants and conditions used.

The ammonium salts prepared as described above can be converted to salts of other amines or of metals by interchanging the ammonium salt with appropriate bases or salts.

Another method is to convert the ammonium salt to the free acid, and then neutralize the free acid with the appropriate base or salt.

The following illustrative examples are presented to further illustrate this invention. In the following examples, parts and percentages are by weight unless otherwise specified.

EXAMPLE 1

A solution of 48.5 parts of 29 percent aqueous ammonium hydroxide is stirred and cooled with an external ice bath to 15° C. To the cooled solution 22 parts of diallyl carbomethoxyphosphonate is slowly added over a 10-minute period. The mixture turns cloudy, but clears up after about 15 minutes. During this time, the mixture is allowed to warm spontaneously to about 30° C. and stirring is continued for 2 hours. The clear solution is stripped under reduced pressure (15 mm. of Hg) at a water-bath temperature of 50° C. The residue is a white crystalline solid which is recrystallized from absolute ethyl alcohol, giving 12.3 parts of ammonium allyl carbamoylphosphonate, m.p. 160°–162.5° C. Nonaqueous titration either as an acid or a base gives a molecular weight of 182±1.

EXAMPLES 2–18

The procedure of example 1 is repeated by substituting an equivalent amount of the indicated "Phosphonate Ester" for the diallyl carbomethoxyphosphonate of example 1 then to produce the indicated "Salt Product."

| Ex. | Phosphonate ester | Salt product |
| --- | --- | --- |
| 2 | Diethyl carbomethoxyphosphonate. | Ammonium ethyl carbamoylphosphonate. |
| 3 | Bis(2-chloroethyl) carbobutoxyphosphonate. | Ammonium 2-chloroethyl carbamoylphosphonate. |
| 4 | Dibutyl carboethoxyphosphonate. | Ammonium butyl carbamoylphosphonate. |
| 5 | Diallyl carboethoxyphosphonate. | Ammonium allyl carbamoyl phosphonate. |
| 6 | Dimethallyl carbomethoxyphosphonate. | Ammonium methallyl carbamoylphosphonate. |
| 7 | Diisopropyl carboethoxyphosphonate. | Ammonium isopropyl carbamoylphosphonate. |
| 8 | Dimethyl carbomethoxyphosphonate. | Ammonium methyl carbamoylphosphonate. |
| 9 | Dipropyl carbopropoxyphosphonate. | Ammonium propyl carbamoylphosphonate. |
| 10 | Diisobutyl carbomethoxyphosphonate. | Ammonium isobutyl carbamoylphosphonate. |
| 11 | Dihexyl carbomethoxyphosphonate. | Ammonium hexyl carbamoylphosphonate. |
| 12 | Dioctyl carbomethoxyphosphonate. | Ammonium octyl carbamoylphosphonate. |
| 13 | Bis(2-methoxyethyl) carbomethoxyphosphonate. | Ammonium 2-methoxyethyl carbamoylphosphonate. |
| 14 | Bis(2-bromopropyl) carbomethoxyphosphonate | Ammonium 2-bromopropyl carbamoylphosphonate. |
| 15 | Bis(6-chloroheptyl) carbomethoxyphosphonate. | Ammonium 6-chloroheptyl carbamoylphosphonate. |
| 16 | Dioct-2-enyl carbomethoxyphosphonate. | Ammonium oct-2-enyl carbamoylphosphonate. |
| 17 | Bis(2-ethoxypropyl) carbomethoxyphosphonate. | Ammonium 2-ethoxypropyl carbamoylphosphonate. |
| 18 | Bis(2,2,2-trichloroethyl) carbomethoxyphosphonate. | Ammonium 2,2,2-trichloroethyl carbamoylphosphonate. |

EXAMPLE 19

To a stirring ice-chilled solution of 35 parts 40 percent methylamine in water is added slowly 8.4 parts of dimethyl carbomethoxyphosphonate. The mixture is warmed to 25° C. and allowed to stir for 3 hours. The clear solution on stripping under reduced pressure yields 9.6 parts of methylammonium methyl N-methylcarbamoylphosphonate as a colorless oil. The product analyzes for the dihydrate.

EXAMPLES 20–31

The procedure of example 19 is repeated substituting an equivalent amount of the indicated "Aqueous Amine" for the methylamine of example 19 and an equivalent amount of the indicated "Phosphonate Ester" for the dimethyl carbomethoxyphosphonate of example 19 to obtain the indicated "Salt Product." The indicated "Salt Products" are isolated as liquids or low melting solids.

EXAMPLE 32

Eight parts of diethyl N-methylcarbamoylphosphonate is added slowly to 18 parts of a 29 percent aqueous solution of ammonia, with holding of the temperature at 25° C by external cooling. The unreacted ammonium hydroxide is allowed to evaporate, giving a white, crystalline, solid residue. Recrystallization from absolute ethanol gives 5 parts of ammonium ethyl N-methylcarbamoylphosphonate, m.p. 189° C.

EXAMPLES 33–42

The procedure of example 32 is repeated substituting an equivalent amount of the indicated "Aqueous Amine" for the ammonia of example 32 and an equivalent amount of the indicated "Phosphonate Ester" for the diethyl methylcarbamoylphosphonate of example 32 to obtain the indicated "Salt Product."

| Ex. | Aqueous amine | Phosphonate ester | Salt product |
| --- | --- | --- | --- |
| 20 | Methylamine (40%) | Diethyl carboethoxyphosphonate | Methylammonium ethyl N-methylcarbamoylphosphonate. |
| 21 | do | Diisopropyl carbomethoxyphosphonate | Methylammonium isopropyl N-methylcarbamoylphosphonate. |
| 22 | do | Diallyl carbomethoxyphosphonate | Methylammonium allyl N-methylcarbamoylphosphonate. |
| 23 | Dimethylamine (25%) | Diethyl carbomethoxyphosphonate | Dimethylammonium ethyl N,N-dimethylcarbamoylphosphonate. |
| 24 | Allylamine (30%) | Diallyl carbomethoxyphosphonate | Allylammonium allyl N-allylcarbamoylphosphonate. |
| 25 | Methylhydrazine (50%) | Diethyl carboethoxyphosphonate | 2-methylcarbazoylphosphonic acid, ethyl ester, salt with methylhydrazine |
| 26 | Diethanolamine | Diethyl carbomethoxyphosphonate | Diethanolammonium ethyl N,N-bis-(2-hydroxyethyl)-carbamoylphosphonate. |
| 27 | Butylamine (50%) | Dibutyl carbomethoxyphosphonate | Butylammonium butyl N-butylcarbamoylphosphonate. |
| 28 | Di-sec-butylamine (25%) (50–50 ethanol-water solvent). | Dimethyl carbomethoxyphosphonate | Di-sec-butylammonium methyl N,N-di-sec-butylcarbamoylphosphonate. |
| 29 | Diethylamine (25%) | Dimethylallyl carbopropoxyphosphonate | Diethylammonium methallyl N,N-diethylcarbamoylphosphonate. |
| 30 | Piperidine (50%) | Dibenzyl carbomethoxyphosphonate | Piperidinium benzyl piperidinocarbonyl phosphonate. |
| 31 | 1,1-dimethylhydrazine (35%) | Dipropyl carbomethoxy phosphonate | 1,1-dimethyl hydrazinium propyl-3,3-dimethylcarbazoylphosphonate. |

| Ex. | Aqueous amine | Phosphonate ester | Salt product |
|---|---|---|---|
| 33 | Ammonia (20%) | Diethyl N-butyl carbamoylphosphonate | Ammonium ethyl N-butyl carbamoylphosphonate |
| 34 | Ammonia (29%) | Diallyl N-allylcarbamoylphosphonate | Ammonium allyl N-allyl carbamoylphosphonate |
| 35 | Methylamine (40%) | Dibutyl N-sec-butylcarbamoylphosphonate | Methylammonium butyl N-sec-butylcarbamoylphosphonate. |
| 36 | Methylamine (25%) | Dimethyl N,N-diallyl carbamoylphosphonate | Methylammonium methyl N,N-diallylcarbamoylphosphonate. |
| 37 | Dimethylamine (25%) | Diethyl carbamoylphosphonate | Dimethylammonium ethyl carbamoylphosphonate. |
| 38 | Propylamine (20%) | Dimethyl N-propylcarbamoylphosphonate | Propylammonium methyl N-propylcarbamoylphosphonate |
| 39 | Allylamine (25%) | Diallyl carbamoylphosphonate | Allylammonium allyl carbamoylphosphonate. |
| 40 | Isobutylamine (20%) | Diisopropyl N-methyl carbamoylphosphonate | Isobutylammonium isopropyl N-methylcarbamoylphosphonate. |
| 41 | Methylamine (20%) | Diisopropyl morpholino carbonylphosphonate | Methylammonium isopropyl morpholinocarbonylphosphonate. |
| 42 | Morpholine (50%) | Dioctyl N-butylcarbamoylphosphonate | Morpholinium octyl N-butyl carbamoylphosphonate |
| 43 | Butylhydrazine | Diethylcarbamoylphosphonate | Butylhydrazinium ethyl carbamoylphosphonate |
| 44 | Triethanolamine | Diallyl carbamoylphosphonate | Triethanolammonium allyl carbamoylphosphonate |

| Ex. | Alkenyl reagent | Halogen | Product |
|---|---|---|---|
| 46 | Ammonium oct-2-enyl carbamoylphosphonate | Bromine | Ammonium 2,3-dibromooctyl carbamoylphosphonate. |
| 47 | Ammonium methallyl carbamoylphosphonate | Chlorine | Ammonium 2,3-dichloro-2-methylpropyl carbamoylphosphonate. |
| 48 | Ammonium but-2-enyl carbamoylphosphonate | Bromine | Ammonium 2,3-dibromobutyl carbamoylphosphonate |

| Ex. | Aqueous amine | Phosphonate ester | Salt product |
|---|---|---|---|
| 50 | Methylamine (40%) | Benzyl methyl carbomethoxyphosphonate | Methylammonium benzyl N-methylcarbamoylphosphonate |
| 51 | Ammonia (29%) | Methyl phenyl carbomethoxyphosphonate | Ammonium phenyl carbamoylphosphonate. |
| 52 | Dimethylamine (25%) | Butyl ethyl carbomethoxyphosphonate | Dimethylammonium butyl N,N-dimethylcarbamoyl phosphonate. |
| 53 | Ethylamine (50%) | Methyl propargyl carbomethoxyphosphonate | Ethylammonium propargyl N-ethylcarbamoylphosphonate. |
| 54 | Allylamine (25%) | Methyl allyl carboethoxyphosphonate | Allylammonium allyl N-allyl carbamoylphosphonate. |
| 55 | Pyrrolidine (30%) | Methyl propyl carbomethoxyphosphonate | Pyrrolidinium propyl pyrrolidinocarbonylphosphonate. |
| 56 | Ammonia (29%) | Methyl octyl carbomethoxyphosphonate | Ammonium octyl carbamoylphosphonate. |

| Ex. | Base | Phosphenate | Salt product |
|---|---|---|---|
| 58 | Tetraethylammonium hydroxide | Ammonium allyl carbamoylphosphonate | Tetraethylammonium allyl carbamoylphosphonate. |
| 59 | Trimethylamine (large excess) | Ammonium ethyl N-methylcarbamoylphosphonate | Trimethylammonium ethyl N-methylcarbamoylphosphonate |
| 60 | Tetramethylammonium hydroxide | Ammonium isobutyl N,N-dibutylcarbamoylphosphonate | Tetramethylammonium isobutyl N,N-dibutylcarbamoylphosphonate. |
| 61 | Dodecyltriethylammonium hydroxide | Methylammonium butyl N-butyl carbamoyl phosphonate | Dodecyltriethylammonium butyl N-butylcarbamoylphosphonate. |
| 62 | Ethanolamine | Ammonium methallyl hexahydroazepinocarbonylphosphonate | Ethanolammonium methallyl hexahydroazepinocarbonylphosphonate. |
| 63 | Benzylamine | Ethylammonium isopropyl carbamoylphosponate | Benzylammonium isopropyl carbamoyl phosphonate. |

EXAMPLE 45

To a mixture of 12.1 parts of ammonium allylcarbamoylphosphonate and 100 parts of ethanol is added dropwise 8 parts of bromine. The reaction mixture is filtered giving 8.5 parts of ammonium 2,3-dibromopropyl carbamoylphosphonate, m.p. 165°–168° C.

EXAMPLES 46–48

The procedure of example 45 is repeated substituting an equivalent amount of the indicated "Alkenyl Reagent" for the ammonium allylcarbamoylphosphonate of example 45 and an equivalent amount of the indicated "Halogen" for the bromine of example 45 to obtain the indicated "Product."

EXAMPLE 49

An aqueous solution of 45 parts of ammonium hydroxide is stirred and chilled with an ice bath, while 24.4 parts of benzyl methyl carbomethoxyphosphonate is added slowly. Stirring is continued until a clear solution is obtained. Unreacted ammonium hydroxide and water are removed from the mixture under reduced pressure, leaving as a solid residue ammonium benzyl carbamoylphosphonate.

EXAMPLES 50–56

The procedure of example 49 is repeated substituting an equivalent amount of the indicated "Aqueous Amine" for the ammonium hydroxide of example 49 and an equivalent amount of the indicated "Phosphonate Ester" for the benzyl methyl carbomethoxyphosphonate of example 49 to obtain the indicated "Salt Product."

EXAMPLE 57

To a stirring suspension of 25.4 parts ammonium butyl N-butylcarbamoylphosphonate and 100 parts methanol is added 42 parts of a 40 percent solution of benzyltrimethylammonium hydroxide in methanol. Ammonia and methanol are stripped from the mixture at 40° C under reduced pressure, leaving benzyltrimethylammonium butyl N-butylcarbamoylphosphonate as a residue

EXAMPLES 58–63

The procedure of example 57 is repeated substituting an equivalent amount of the indicated "Base" for the benzyl trimethylammonium hydroxide of example 57 and an equivalent amount of the indicated "Ammonium Phosphonate" for the ammonium butyl N-butylcarbamoylphosphonate of example 57 to obtain the indicated "Salt Product."

EXAMPLE 64

A 5 percent aqueous solution of ammonium propyl N-methylcarbamoylphosphonate is passed through a packed column of sulfonated polystyrene copolymer hydrogen type resin to convert the salt to the free acid. This is neutralized with the equivalent amount of sodium bicarbonate to give a solution of essentially pure sodium propyl N-methylcarbamoylphosphonate. Evaporation of this solution gives the solid salt product.

EXAMPLES 65–72

The procedure of example 64 is repeated, first obtaining the free acids of the indicated "Ammonium Phosphonate" as was done in example 64 and then neutralizing the acid with the indicated "Base" according to the procedure of example 64 to obtain the indicated "Salt Product."

| Ex. | Ammonium phosphonate | Base | Salt product |
|---|---|---|---|
| 65 | Ammonium phenyl carbamoylphosphonate | Sodium bicarbonate | Sodium phenyl carbamoylphosphonate. |
| 66 | Ammonium benzyl carbamoylphosphonate | Calcium hydroxide | Hemicalcium benzyl carbamoylphosphonate. |
| 67 | Ammonium ethyl carbamoylphosphonate | Barium hydroxide | Hemibarium ethyl carbamoylphosphonate. |
| 68 | Ammonium methyl N,N-dimethylcarbamoyl phosphonate. | Hydroxyethyltrimethyl- ammonium hydroxide. | Hydroxyethyltrimethylammonium methyl N,N-dimethyl-carbamoylphosphonate. |
| 69 | Ammonium benzyl carbamoylphosphonate | Benzyltrimethylammonium hydroxide. | Benzyltrimethlammonium benzyl carbamoylphosphonate. |
| 70 | Ammonium allyl carbamoylphosphonate | Magnesium hydroxide | Hemimagnesium allyl carbamoylphosphonate. |
| 71 | Ammonium butyl N-methyl carbamoylphosphonate. | Morpholine | Morpholinium butyl N-methylcarbamoylphosphonate. |
| 72 | Ammonium isopropyl morpholinocarbonyl-phosphonate. | Trimethylamine | Trimethylammonium isopropyl morpholino carbonylphosphonate. |

EXAMPLE 73

To a stirred solution of 10 parts of potassium bicarbonate and 50 parts of water is added 18.4 parts of ammonium isobutyl carbamoylphosphonate. Stirring is continued until solution is complete. The solution is evaporated to dryness, giving the solid product, potassium isobutyl carbamoylphasphonate.

EXAMPLES 74–79

The procedure of example 73 is repeated substituting the indicated "Bicarbonate Salt" for the potassium bicarbonate of example 73 and an equivalent amount of the indicated "Carbamoylphosphonate" for the ammonium mono-isobutyl carbamoylphosphonate of example 73 to obtain the indicated "Salt Product."

| Ex. | Bicarbonate salt | Carbamoylphosphonate | Salt product |
|---|---|---|---|
| 74 | Sodium bicarbonate | Ammonium ethyl N-methylcarbamoylphosphonate. | Sodium ethyl N-methylcarbamoylphosphonate. |
| 75 | Potassium bicarbonate. | Ammonium benzyl carbamoylphosphonate. | Potassium benzyl carbamoylphosphonate. |
| 76 | Lithium bicarbonate. | Ammonium methyl N-butylcarbamoylphosphonate. | Lithium methyl N-butylcarbamoylphosphonate. |
| 77 | Tetramethylammonium bicarbonate. | Ammonium allyl piperidinocarbonylphosphonate. | Tetramethylammonium allyl piperidinocarbonylphosphonate. |
| 78 | Benzyltrimethylammonium bicarbonate. | Ammonium butyl carbamoylphosphonate | Benzyltrimethylammonium butyl carbamoylphosphonate. |
| 79 | Pentamethylhydrazinium bicarbonate. | ...do... | Pentamethylhydrazinium butyl carbamoylphosphonate |

FORMULATION

Compositions of the compounds of formula (1) suitable for application according to the method of this invention can be prepared by admixing at least one of the compounds of this invention with pest control adjuvants or modifiers to provide compositions in the form of dusts, wettable or water-soluble powders, solutions, granules or pellets. In addition, the plant growth modifying agents such as maleic hydrazide and "Alar" (N-dimethylaminosuccinamic acid) can be included in the compositions of this invention in combination with the compounds of this invention.

Compositions of the invention, may contain as a conditioning agent one or more surface-active agents, sometimes called surfactants, in amounts sufficient to render a given composition containing the compounds of this invention readily dispersible or soluble in water or capable of wetting foliage efficiently.

The surface-active agent used in this invention can be a wetting, dispersing or an emulsifying agent which will assist dispersion and solution of the active compound. The surface-active agent or surfactant can include such anionic, cationic and nonionic agents as have heretofore been generally employed in plant control compositions of similar type. Suitable surface-active agents are set forth, for example in "Detergents and Emulsifiers" 1967 Annual by John W. McCutcheon, Inc.

In general, less than 10 percent by weight of the surface-active agent will be used in compositions of this invention and ordinarily the amount of surface-active agents will range from 1–5 percent but may even be less than 1 percent by weight.

Additional surface-active agents can be added to the formulations to increase the ratio of surfactant: active ingredient up to as high as 5:1 by weight. Such compositions may have a greater effectiveness than can be expected from a consideration of the activity of the components used separately. When used at higher rates, it is preferred that the surfactant be present in the range of one-fifth to five parts surfactant for each one part of active agent.

WATER-SOLUBLE POWDERS

Water-soluble powders are compositions containing the water-soluble active material, an inert solid extender which may or may not be water-soluble, and optionally one or more surfactants to provide rapid wetting and solution. A buffer, which may also function as an extender, can be present to improve formulation stability and to control the pH of the final spray solution.

The classes of extenders suitable for the water-soluble powder formulations of this invention are the natural clays, diatomaceous earth, synthetic mineral fillers derived from silica and silicate, starch, sugar, and inorganic salts. Most preferred fillers for this invention are kaolinites, attapulgite clay, montmorillonite clays, synthetic silicas, synthetic magnesium silicate, calcium sulfate dihydrate, and disodium hydrogen phosphate Suitable surfactants for use in such compositions are those listed by J. W McCutcheon in "Detergents and Emulsifiers" 1967 Annual. Among the more preferred surfactants are the nonionic and anionic types, and those most suitable for the preparation of the dry, soluble products of this invention are solid forms of compounds known to the art as wetters and dispersants. Occasionally a liquid, nonionic compound classified primarily as an emulsifier may serve as both wetter and dispersant.

Most preferred wetting agents are alkylbenzene- and alkylnaphthalene- sulfonates, sulfated fatty alcohols, amines or acid amides, long-chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methylcellulose, polyvinyl alcohol, lignin sulfonates, polymeric alkylnaphthalenesulfonates, sodium naphthalenesulfonate, polymethylene bisnaphthalenesulfonate, and sodium N-methyl-N-(long-chain acid) tuarates.

Wetting and dispersing agents in these preferred water-soluble compositions of this invention are usually present at concentrations up to 5 weight percent. The inert extender then completes the formulation. Where needed, 0.1 weight percent to 1.0 weight percent of the extender may be replaced by a corrosion inhibitor or an antifoaming agent or both.

Thus, water-soluble formulations of the invention will contain from about 25 to 98 weight percent active material, up to 2.0 weight percent wetting agent, up to 5.0 weight percent dispersant, and from 2 to 75 weight percent inert extender, as these terms are described above.

When the water-soluble powder contains a corrosion inhibitor or an antifoaming agent or both, the corrosion inhibitor will not exceed about 1 percent of the composition, and the antifoaming agent will not exceed about 0.5 percent by weight of the composition, both replacing equivalent amounts of the inert extender.

WETTABLE POWDERS

Certain compounds of this invention have sufficiently low water-solubility so that most of the active ingredient will not go into solution at the concentration at which it will be applied in the spray slurry. In this case the wettable powder formulations are preferred. Wettable powders contain from about 25 to 95 weight percent active material, from about 0.5 to 2.0 percent wetting agent, from about 0.25 to 5.0 percent dispersant, and from 4.25 percent to 74.25 percent inert extender; these terms referring to the same limits of formulation additives described for the water-soluble powders. As described above, small amounts of corrosion inhibitor and antifoaming agents may replace some of the inert extender.

SOLUTION CONCENTRATES

The aqueous solution concentrates are prepared by mixing a water-soluble active compound of this invention with water. A portion of the water of all of it may be replaced with methanol, ethanol, isopropanol, ethylene glycol, cellosolve, methyl cellosolve, dimethylformamide, dimethylsulfoxide, of N-methylpyrrolidone. Surfactants and buffering agents can optionally be present.

These solution concentrates will contain from 15 to 50 percent of active ingredient, and from 50 to 85 percent water and/or hydroxylated organic solvent. Surfactants, corrosion inhibitors, buffering and antifoam agents may also be included in which case they may replace up to 10 percent of the solvent system.

DUSTS

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, adsorptive grinding aid. For the dust compositions of this invention, the inert extender may be either of vegetable or mineral origin, the wetting agent is preferably anionic or nonionic and suitable adsorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid adsorption. Suitable classes of grinding aids are natural clays, diatomaceous earths, and synthetic mineral fillers derived from silica or silicate. Among ionic and nonionic wetting agents, the most suitable are the members of the group known to the art as wetting agents and emulsifiers. Although solid agents are preferred because of ease in incorporation some liquid nonionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust", a trademark of the American Agricultural Company.

Preferred grinding aids are attapulgite clay, diatomaceous silica, synthetic fine silica and synthetic calcium and magnesium silicates. Preferred wetting agents are those previously described under water-soluble powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The water-soluble powders described above can also be used in the preparation of dusts. While such water-soluble powders could be used directly in dust form, it is more advantageous to dilute them by blending with the dense dust diluent. In this manner, dispersing agents, corrosion inhibitors, and antifoam agents may also be found as components of a dust.

Thus, the dust compositions of this invention will comprise about 5 to 20 weight percent active material, 5 to 50 weight percent adsorptive filler, 0 to 1.0 weight percent wetting agent, and about 25 to 90 weight percent dense, free-flowing dust diluent, as these terms are used herein. Such dust formulations can contain, in addition, minor amounts of dispersants, corrosion inhibitors, and antifoam agents, derived from the water-soluble powders used to make the dusts.

GRANULES AND PELLETS

Under some circumstances it may be advantageous to apply the compounds of this invention in the form of granules or pellets. Suitable carriers are natural clays, some pyrophyllites and vermiculites. Wetting agents of the type listed by J. W. McCutcheon in "Detergents and Emulsifiers" 1967 Annual can also be present to aid leaching of the active component.

One method of preparation suitable for both granules and pellets involves blending the active ingredient with clays, water-soluble salts, surfactants and a small amount of water. After pelleting and/or granulating, the formulation is dried prior to use. A second method suitable for the preparation of granules formulation involves spraying solution of the active material on porous, adsorptive, preformed clay or vermiculite granules. Granular amines of vegetable origin, such as corn cob, can also be used. Surfactants listed by McCutcheon can also be included in the spray solution. After drying, the granules are ready for application.

The preferred granules or pellets will contain about 5 to 30 weight percent of active material, about 0 to 5 weight percent wetting agent and about 65 to 95 weight percent inert carrier.

APPLICATION

As stated previously this invention relates to a method for increasing the sugar content of sugar containing crops by applying an effective amount of a compound of formula (1) to such crop from 2 to 8 weeks prior to normally scheduled harvest.

It has been discovered that the compounds of formula (1) when applied to plants will enhance the yield of sugar when compared to untreated plots grown under the same growing conditions. The practice of this invention also increases the juice purity with a significant decrease in extraneous matter at the time of harvest which results in a more efficient and economical milling of the crop.

Generally, the compound of formula (1) is applied to the plant during the last quarter of the period of plant growth and is timed to coincide with the development of sugar in the useful portion of the plant. In most situations this means that a physiologically effective amount of the compound of formula (1) will be applied during the period of 2 to 8 weeks prior to the normal time of harvest.

It will be appreciated that the amount of a compound of formula (1) that will be effective to increase the sugar content of sugar-containing crops will vary, for example with the particular crop involved, plant density, the type of formulation and application method utilized, maturity of the crop, soil type, season of the year, prevailing weather conditions, the particular active ingredient utilized and the frequency of the application. Since many factors are involved, it is not possible to indicate generally one rate of application which is preferred or even suitable for all situations. However, effective resolution of these factors in determining the effective amount in any given situation is well within the ability of persons of ordinary skill in the art.

Usually only one application ranging from 0.25 to 20 kilograms of active per hectare is needed. Preferably the composition will be applied at a rate of from 1 to 4 kilograms of active per hectare.

It will also be appreciated that there are a number of methods that can be used for applying the active compound to the plant. Spray application being the most convenient, is therefore the most commonly used method. The compositions can be sprayed from air or ground carriers. In the application of the active compound particular attention should be given to thorough and uniform coverage of the crop treated to obtain the desired results.

There follow some nonlimiting examples which illustrate the method of this invention. In the examples, parts and percentages are by weight unless otherwise noted.

EXAMPLE 80

A dust having the following formula is prepared:

| | |
|---|---|
| Ammonium allyl carbamoylphosphonate | 5.0 percent |
| Talc | 64.0 percent |
| Attapulgite | 30.0 percent |
| Sodium dodecylbenzenesulfonate | 1.0 percent |

The active component is ground with the minor diluent and the surfactant to pass a 0.149 mm. screen. This material is then blended with the major diluent to form a dust composition.

It will be understood that the other compounds of this invention can also be formulated in a like manner.

The dust formulation of example 80 is applied, using a helicopter, at the rate of 100 kilograms per hectare, to a 3-hectare field of sugar cane 6 weeks prior to harvest. At harvest the treated field yields significantly more raw sugar per hectare than a similar untreated plot in the same field. This treatment also results in juice of increased purity with a hectare decrease in extraneous matter at the time of crushing, resulting in a more efficient and economical milling.

EXAMPLE 81

A water-soluble powder of the following formula is prepared.

| | |
|---|---|
| Ammonium allyl carbamoylphosphonate | 95.0 percent |
| Synthetic silica | 3.5 percent |
| Disodium hydrogen phosphate | 1.0 percent |
| Dioctyl sodium sulfosuccinate | 0.5 percent |

The above ingredients are mixed and then ground to pass a 0.42 mm. screen. The resulting formulation is a water-soluble powder, with the exception of the synthetic silica conditioning agent.

The following compounds of this invention can also be formulated in like manner.

Ammonium 2-chloroethyl carbamoylphosphonate
Ammonium methyl carbamoylphosphonate
Ammonium isopropyl carbamoylphosphonate
Sodium phenyl carbamoylphosphonate
Hemicalcium benzyl carbamoylphosphonate
hemibarium ethyl carbamoylphosphonate
Ammonium 2,3-dibromopropyl carbamoylphosphonate
Diethylammonium ethyl carbamoylphosphonate
Ammonium octyl carbamoylphosphonate Four kilograms of the water-soluble powder formulation of example 81 is dissolved in 200 liters of water and 0.5 percent of a nonphytotoxic wetting agent is added. This solution is sprayed on one hectare of syrup sorghum 4 weeks prior to harvest. The treatment results in an increase in the sucrose content of the plant sap over a similar but untreated hectare in the same field. As a result, the yield of syrup is increased when the sap is extracted and refined.

EXAMPLE 82

A wettable powder of the following formula is prepared.

| | |
|---|---|
| Hemibarium benzyl dibutylcarbamoyl phosphonate | 50.0 percent |
| Montmorrilonite | 43.0 percent |
| Synthetic silica | 4.0 percent |
| Disodium hydrogen phosphate | 1.0 percent |
| Sodium alkylnaphthalenesulfonate | 1.0 percent |
| Sodium lignin sulfonate | 1.0 percent |

The above ingredients are mixed and then ground to pass a 0.25 mm. screen. The active ingredient in the above formulation dissolves when the composition is added to water.

Ten kilograms of the formulation of example 82 are added to 400 liters of water and agitated until the active ingredient dissolves. This solution is then sprayed on one hectare of sugar cane five weeks prior to harvest. At harvest, the treated field yields more raw sugar per hectare than a similar but untreated plot in the same field.

EXAMPLE 83

A solution of the following formula is prepared.

| | |
|---|---|
| Ammonium ethyl carbamoylphosphonate | 24.0 percent |
| Disodium hydrogen phosphate | 1.0 percent |
| Sodium laurylsulfate | 0.5 percent |
| Water | 74.5 percent |

The above components are blended to form a homogeneous solution.

The following compounds can be formulated in like manner.

Benzyltrimethylammonium benzyl N-butylcarbamoylphosphonate
Trimethylammonium ethyl N-methylcarbamoylphosphonate
Methylammonium isopropyl morpholinocarbonylphosphonate
Triethylammonium ethyl carbamoylphosphonate Ten kilograms of the solution prepared in example 83 are added to 200 liters of water and applied with a fixed-boom sprayer to one hectare of sugar cane 8 weeks prior to harvest. As a result of this treatment the cane ripens with a significant increase in sugar yields. This treatment also reduces lodging before harvest.

EXAMPLE 84

A solution of the following formula is prepared.

| | |
|---|---|
| Allylammonium allyl N,N-diallylcarbamoylphosphonate | 24.0 percent |
| Trimethylnonylpolyethyleneglycol ether | 1.0 percent |
| Water | 20.0 percent |
| Ethylene Glycol | 55.0 percent |

The above components are blended to form a homogeneous solution.

The following components can be formulated in like manner:

Ethanolammonium methallyl hexahydroazepinocarbonylphosphonate
Dodecyltrimethylammonium butyl butylcarbamoylphosphonate
Ammonium hexyl carbamoylphosphonate Six kilograms of the formulation of example 84 are added to 400 liters of water containing 0.5 percent Tween 20 (polyoxyethylenesorbitan monolaurate). This solution is sprayed to runoff on one hectare of sugar beets. As a result of this treatment the crop matures with a significant increase in sugar yield.

EXAMPLE 85

The following formulation is prepared.

| | |
|---|---|
| Ammonium methyl carbamoylphosphonate | 25.0 percent |
| Sodium lauryl sulfate | 50.0 percent |
| Magnesium silicate | 10.0 percent |
| Kaolinite | 15.0 percent |

The above components are blended, micropulverized to pass a 0.30 mm. screen and reblended.

The following compounds can be formulated in like manner.

Morpholinium ethyl carbamoylphosphonate
Sodium phenyl carbamoylphosphonate
Hemicalcium benzyl carbamoylphosphonate Five kilograms of the formulation of example 85 are suspended in 100 liters of water and then sprayed on one hectare of sugarcane 4 weeks prior to harvest. At harvest the treated area yields more raw sugar than a similar untreated hectare in the same field.

EXAMPLE 86

A wettable powder of the following formula is prepared:

| | |
|---|---|
| Ammonium isopropyl carbamoylphosphonate | 50 percent |
| Montmorillonite | 43 percent |
| Synthetic silica | 4 percent |
| Disodium hydrogen phosphate | 1 percent |
| Sodium alkylnaphthalenesulfonate | 1 percent |
| Sodium lignin sulfonate | 1 percent |

The above ingredients are mixed and then ground to pass a 0.25 mm. screen. The active ingredient in the above formulation dissolves when the composition is added to water.

Ten kilograms of the formulation of example 86 are added to 400 liters of water and agitated until the active ingredient dissolves. This solution is then sprayed on one hectare of sugar cane 6 weeks prior to harvest. The treatment results in an increase in the yield of sugar. The treatment also increases the juice purity with a significant decrease in extraneous matter at the time of crushing resulting in a more efficient and economical milling.

We claim:

1. A method of increasing the sugar content of a sugar-containing crop comprising applying to said crop from 2 to 8 weeks prior to normally scheduled harvest an effective amount of a compound of the formula $$R_1-O-\overset{O}{\underset{OM}{\overset{\uparrow}{P}}}-\overset{O}{\overset{\|}{C}}-N\overset{H}{\underset{H}{\diagup}}$$

where $R_1$ is alkyl of one through four carbon atoms, or alkenyl of three through four carbon atoms, and M is sodium, lithium, potassium, or ammonium.

2. The method of claim 1 wherein said compound is ammonium allyl carbamoylphosphonate.

3. The method of claim 1 wherein said compound is ammonium ethyl carbamoylphosphonate.

4. The method of claim 1 wherein said compound is ammonium isopropyl carbamoylphosphonate.

5. The method of claim 1 wherein the crop is sugar cane.

6. The method of claim 1 wherein the crop is sorghum.

7. The method of claim 1 wherein the crop is sugar beets.

* * * * *